(12) United States Patent
Ramos-Ortiz et al.

(10) Patent No.: US 7,612,935 B2
(45) Date of Patent: Nov. 3, 2009

(54) THIRD-ORDER OPTICAL AUTOCORRELATOR FOR TIME-DOMAIN OPERATION AT THE TELECOMMUNICATION WAVELENGTHS

(75) Inventors: Gabriel Ramos-Ortiz, Quintas Sn Lorenzo (MX); Myoungsik Cha, Punsan (KR); Seth R. Marder, Atlanta, GA (US); Bernard Kippelen, Decatur, GA (US)

(73) Assignee: The Arizona Board of Regents on Behalf of The University of Arizona, Tucson, AZ (US)

( * ) Notice: Subject to any disclaimer, the term of this patent is extended or adjusted under 35 U.S.C. 154(b) by 78 days.

(21) Appl. No.: 10/557,809

(22) PCT Filed: Dec. 19, 2003

(86) PCT No.: PCT/US03/37093

§ 371 (c)(1),
(2), (4) Date: Dec. 21, 2006

(87) PCT Pub. No.: WO2004/109345

PCT Pub. Date: Dec. 16, 2004

(65) Prior Publication Data

US 2007/0223082 A1 Sep. 27, 2007

Related U.S. Application Data

(60) Provisional application No. 60/474,230, filed on May 30, 2003.

(51) Int. Cl.
*G02F 2/02* (2006.01)

(52) U.S. Cl. .................. 359/329; 359/328; 372/22; 252/582; 252/587

(58) Field of Classification Search ........... 252/582, 252/587, 589; 359/326–329; 356/450; 372/22
See application file for complete search history.

(56) References Cited

U.S. PATENT DOCUMENTS 5,207,952 A 5/1993 Griffin, III (Continued)

OTHER PUBLICATIONS

Zhu et al, "Theoretical investigation of the first hyperpolarizability of push-pull polyenes containint non-aromatic cyclic olefines", Sep. 24, 1999, Chemical Physics Letters 311, pp. 306-314.*

(Continued)

*Primary Examiner*—Hemang Sanghavi
(74) *Attorney, Agent, or Firm*—Oblon, Spivak, McClelland, Maier & Neustadt, L.L.P.

(57) ABSTRACT

A device and method for producing a third harmonic signal from an optical pulse of wavelength k. In the device and method, an optical pulse at a wavelength k is incident on a material including at least one molecule having a formula D—Π—A, where D is an electron donor group, A is an electron acceptor group, and Π is a conjugated structure having it bonds that connect D to A. The molecule exhibits a strong absorption band centered at a wavelength $_{ko}$ and a weakly absorbing region centered at a wavelength k, which is less than Xo. A wavelength k/2 has a value of about Xo, and a wavelength k/3 has a value of about $X_1$. A third harmonic signal at k/3 is generated. From a measured third harmonic signal as a function of a time delay for separate optical pulses entering the material, at least one of a pulse width and a pulse shape of the optical pulse can be extracted. From a spectrally resolved third harmonic signal, a phase of the optical pulse can be extracted.

87 Claims, 9 Drawing Sheets

U.S. PATENT DOCUMENTS

| | | |
|---|---|---|
| 5,290,485 A | 3/1994 | Gotoh et al. |
| 5,368,782 A | 11/1994 | Gotoh et al. |
| 5,530,544 A | 6/1996 | Trebino et al. |
| 5,898,717 A | 4/1999 | Yin |
| 6,008,899 A * | 12/1999 | Trebino et al. ............... 356/450 |
| 6,267,913 B1 | 7/2001 | Marder et al. |
| 2003/0086666 A1 * | 5/2003 | Yu ............................ 385/122 |

OTHER PUBLICATIONS

Toshikuni Kaino et al, Third-Order Nonlinear Optical Properties of Heteroaromatic Polymers, Journal of Photopolymer Science and Technology, vol. 6, No. 2 (1993) pp. 239-246.

* cited by examiner

THIRD-ORDER OPTICAL AUTOCORRELATOR FOR TIME-DOMAIN OPERATION AT THE TELECOMMUNICATION WAVELENGTHS

DISCUSSION OF THE BACKGROUND

1. Field of the Invention

This invention relates to the field of ultra-fast laser operation and the characterization of optical pulses.

2. Background of the Invention

Within the research field of ultrashort-pulse lasers and more generally within ultrafast science and technology, there is a need to develop and implement a range of diagnostic techniques for characterizing ultrashort optical pulses that have durations of femtoseconds (fs). At limits where pulses can be shorter than 10 fs, the diagnostics used for quantitative assessments must exhibit a time resolution in the region of ifs. Indeed, driving the development for better characterization has been the continued development of ultra-fast lasers with increasing gains in power and portability. For example, driven by the development of all optical networks with increasing bandwidth, mode-locked erbium doped fiber lasers that emit sub-picosecond pulses at the telecommunication wavelengths have been demonstrated with average powers of several hundred mW. See for example Hofer et al. in Opt. Lett. 23, 1840 (1998), the entire contents of which are incorporated herein by reference.

Characterizations of femtosecond and picosecond pulses in the ultra-fast lasers in the past have involved techniques based on second-order nonlinear processes using non-collinear or collinear geometries providing intensity and interferometric autocorrelations, respectively. Such techniques have been reported by Diels et al. in Appl. Opt. 24, 1270 (1985), the entire contents of which are incorporated herein by reference. Other second-order autocorrelation techniques have been based on two-photon absorption processes in semiconductors. See for example Tagaki et al. in Opt. Lett. 17, 658 (1992), the entire contents of which are incorporated herein by reference. Second order nonlinear processes are usually sufficiently sensitive so that low energy pulses can be characterized. However, second order nonlinear processes suffer from limited sensitivity and are specific only to particular pulse shapes. For instance, second-order autocorrelations when invoking symmetrical functions do not provide information on asymmetric pulses. Furthermore, since second-harmonic signals are typically generated in thick crystals in a geometry that satisfies phase-matching conditions, second order nonlinear process are polarization sensitive and have a limited wavelength tunability range.

Besides second order nonlinear processing, third-order nonlinear processes have been recognized as a method for characterizing ultra-fast laser pulses. In principle, third-order nonlinear processes are superior to second-order ones. However, third-order nonlinear processes are generally limited in sensitivity due to the lack of materials with both a strong third-order nonlinearity and transparency. Third-order techniques prior to the present invention have typically been implemented with fused silica as the optical material. More specifically, as described by Streltsov et al. in Appl. Phys. Lett. 75, 3778 (1999) and by Langlois et al. in Opt. Lett. 24, 1868, (1999), the entire contents of which are incorporated herein by reference, third-order autocorrelation can be implemented by using three-photon absorption in photodiodes. The sensitivity of a third-order autocorrelation using three-photon absorption is somewhat limited. Further, a simultaneous measurement of the spectrum of the nonlinear signal is required to retrieve information on the phase of the pulse. Nonetheless, third-order autocorrelation techniques offer advantages over second-order techniques. See for example Meshulach et al. in J. Opt. Soc. Am. B 14, 2122 (1997), the entire contents of which are incorporated herein by reference.

Solutions based on three-photon absorption in photodiodes, while characterizing asymmetric pulses and removing direction-of-time ambiguity, only provide information on a laser pulse amplitude and not the phase. For the complete characterization of ultra-fast short pulses, full knowledge of both amplitude and phase is required. One technique for simultaneously retrieving information on the phase of the pulse is a frequency-resolved optical gating (FROG) techniques reported by Trebino et al. in Rev. Scientific Instruments, 68, 3277 (1997) and in U.S. Pat. No. 5,530,544, the entire contents of which are incorporated herein by reference. FROG is one technique, where through time-frequency domain measurements, both amplitude and phase information of optical pulses are derived. However, such pulse measurement and methods conventionally have required spectrometers coupled to expensive highly sensitive detector arrays.

SUMMARY OF THE INVENTION

One object of the present invention is to provide a technique for the derivation of amplitude and phase information from short laser pulses without the necessity of coupling a spectrometer to a highly sensitive detector.

Accordingly, one object of the present invention is to provide an optical medium in which third-order non-linear processes are clearly manifest, even being visible to the naked eye.

Still another object of the present invention is to provide an optical material in which a conversion efficiency is achieved without the use of phase matching and/or without the use of quadratic nonlinear effects.

Accordingly, one object of the present invention is to provide an optical material in which third harmonic generation occurs within a thin film organic polymer, thus providing a low cost, sensitive third-order autocorrelator that can be used to ascertain a laser pulse amplitude and phase.

These and other objects are achieved in a device and method for producing a third harmonic signal from an optical pulse of wavelength $\lambda$. In the device and method, an optical pulse at a wavelength $\lambda$ is incident on a material including at least one molecule having a formula D-Π-A, where D is an electron donor group, A is an electron acceptor group, and Π is a conjugated structure having π bonds that connect D to A. The molecule exhibits a strong absorption band centered at a wavelength $\lambda_0$ and a weakly absorbing region centered at a wavelength $\lambda_1$ which is less than $\lambda_0$. A wavelength $\lambda/2$ has a value of about $\lambda_0$, and a wavelength $\lambda/3$ has a value of about $\lambda_1$. A third harmonic signal at $\lambda/3$ is generated. From a measured third harmonic signal as a function of a time delay for separate optical pulses entering the material, at least one of a pulse width and a pulse shape of the optical pulse can be extracted. From a spectrally resolved third harmonic signal, a phase of the optical pulse can be extracted.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
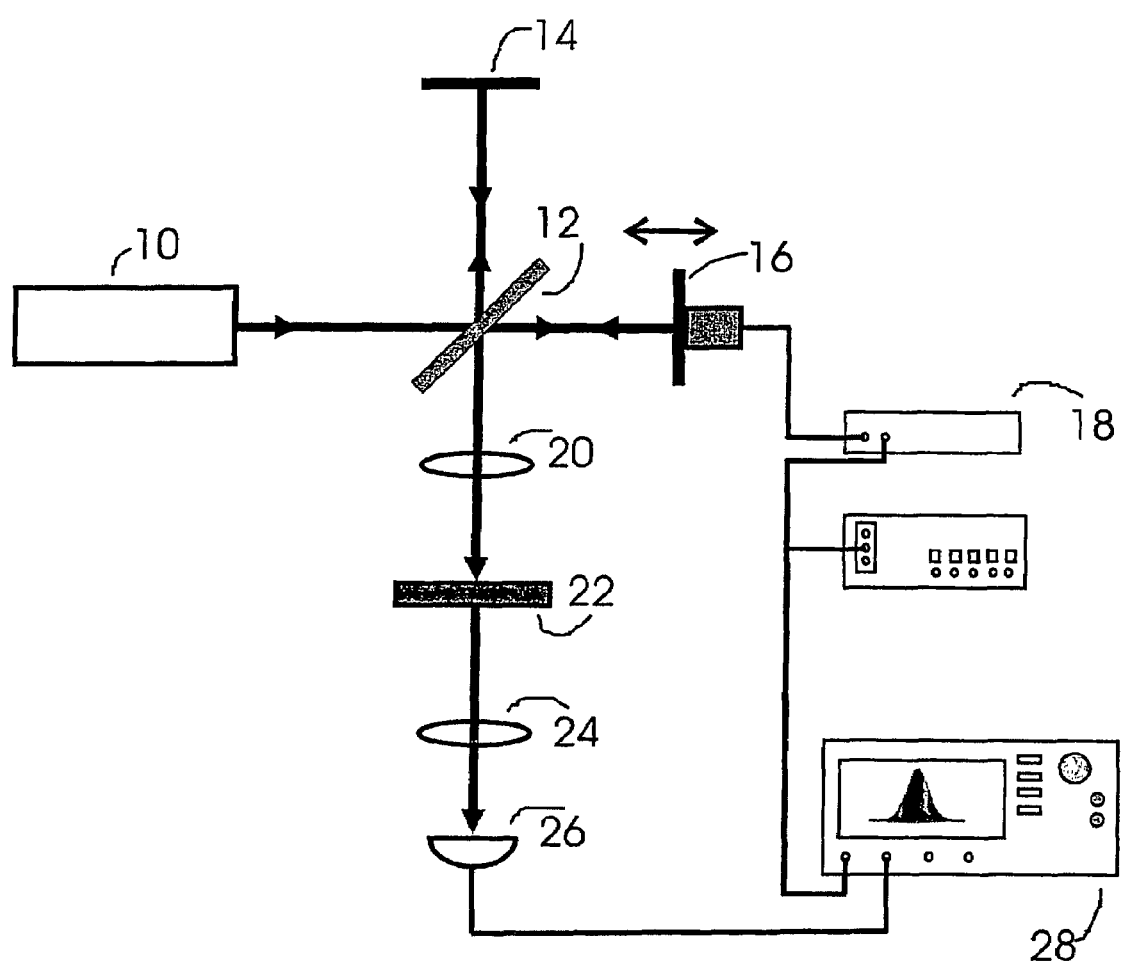
FIG. 1A is a depiction of an optical apparatus according to the present invention utilizing third harmonic generation to produce from a thin film chromophore sample a correlation to the optical pulse.

Referring now to the drawings, wherein like reference numerals designate identical, or corresponding parts throughout the several views, and more particularly to FIG. 1A thereof, FIG. 1A is a depiction of an optical apparatus according to the present invention utilizing third harmonic generation to produce from a thin film chromophore sample a correlation to the optical pulse.

As shown in FIG. 1A, an optical source 10 (e.g., a pulse laser) generates an optical pulse at a wavelength λ. The optical pulse is directed into a divider which receives and divides the pulse into two parts (preferably of equal intensity), at least one part being time delayed from the other part. One part of the divided beam as illustrated in FIG. 1 is divided by the beam splitter 12 and reflected from a stationary mirror 14. The other part of the divided beam as illustrated in FIG. 1 is divided by the beam splitter 12 and reflected from a displaceable mirror 16. In one embodiment of the present invention, displaceable mirror 16 is controlled by a piezoelectric controller 18. Motion of the displaceable mirror 16 sets the time delay between the two parts of the divided beam. As illustrated in FIG. 1A, a divider of the present invention includes for example the beam splitter 12, the stationary mirror 14, the displaceable mirror 16, and the piezoelectric controller 18. Alternatively, the stationary mirror 14 can, according to the present invention, be displaceable. The two divided beams are then recombined at the beam splitter 12. The recombined beams are then focused by lens 20 into an optical material 22, which according to the present invention, includes at least one molecule or molecular group having a formula D-Π-A, where D is an electron donor group, A is an electron acceptor group, and Π is a conjugated structure containing π bonds that connect D to A.

According to the present invention, the molecular group having a formula D-Π-A exhibits a strong absorption band centered at a wavelength $\lambda_0$ and a weakly absorbing region centered at a wavelength $\lambda_1$, such that $\lambda_1 < \lambda_0$. The weakly absorbing region has an absorption coefficient no greater than 10,000 cm$^{-1}$, and preferably less than 1000 cm$^{-1}$. The absorption band wavelength $\lambda_0$ and the weakly absorbing region wavelength $\lambda_1$ are such that $\lambda_0$ is nearly equal to and/or coincides with $\lambda/2$ and such that $\lambda_1$ is nearly equal to and/or coincides with $\lambda/3$.

Interaction of the time delayed optical pulses in the material of the present invention produces light at a third harmonic to the optical pulse wavelength λ. Generation of the third harmonic light depends on the relative time delay between the two divided pulses. Consider for sake of explanation that each pulse shape is that of a Gaussian shape. When there is no time delay the maximum electric field strength is present and the highest amount of third harmonic light is generated. When the time delay is such that the time delay differs from zero, the overlapping of the pulses (on the material) decreases, and so the amount of third harmonic, in the limit for very long delays where there is no overlapping at all, is zero. The minimum electric field strength is present and the smallest amount of third harmonic light will be generated. Hence, by varying the time delay between the two divided pulses an overlap "mapping" of the pulse shapes is detected. Since the time delay is arbitrarily varied, a mapping of the "overlap" occurs at speeds readily detected and measured by optical detectors. From the "overlap" mapping, pulse characterization such as pulse duration can be derived.

When two pulses are combined in a nonlinear optical medium, one variably delayed pulse can be considered as a gate pulse for the other pulse to be measured. The resulting signal-pulse electric fields are a function of non-linear interactions at harmonic levels between the two interacting (out-of-phase) parts. By measuring the width of the autocorrelation trace (usually determined as the Full Width at the Half Maximum FWHM) the duration of the actual pulse can be inferred assuming a pulse shape. Hence, the pulse duration is determined from the ratio between the FWHM of the autocorrelation trace and that of the assumed pulse.

Techniques similar to those described by Trebino et al. in U.S. Pat. No. 5,530,544, the entire contents of which are incorporated herein by reference, can be utilized by an extractor 28 to calculate (i.e., extract) a pulse duration of the optical pulse from a temporal form of the third harmonic signal, correlated in time, i.e. occurring simultaneously in time with the incidence of the optical signal in the optical material. Further, in the frequency resolved optical gating (FROG) technique of Trebino et al., an output signal spectrum is measured, as a function of the delay between the two input pulses, i.e., the spectra of a series of temporal slices of the probe pulse. From the measured signal as a function of frequency and time delay, pulse shapes and/or phases can be retrieved using known techniques such as for example iterative Fourier transform analysis in which can provide unique solutions for the resulting electric field pulse shape, pulse width, and phase. A more thorough discussion of a frequency resolved optical gating technique applied in the present invention will be discussed later.

Figure 2A:
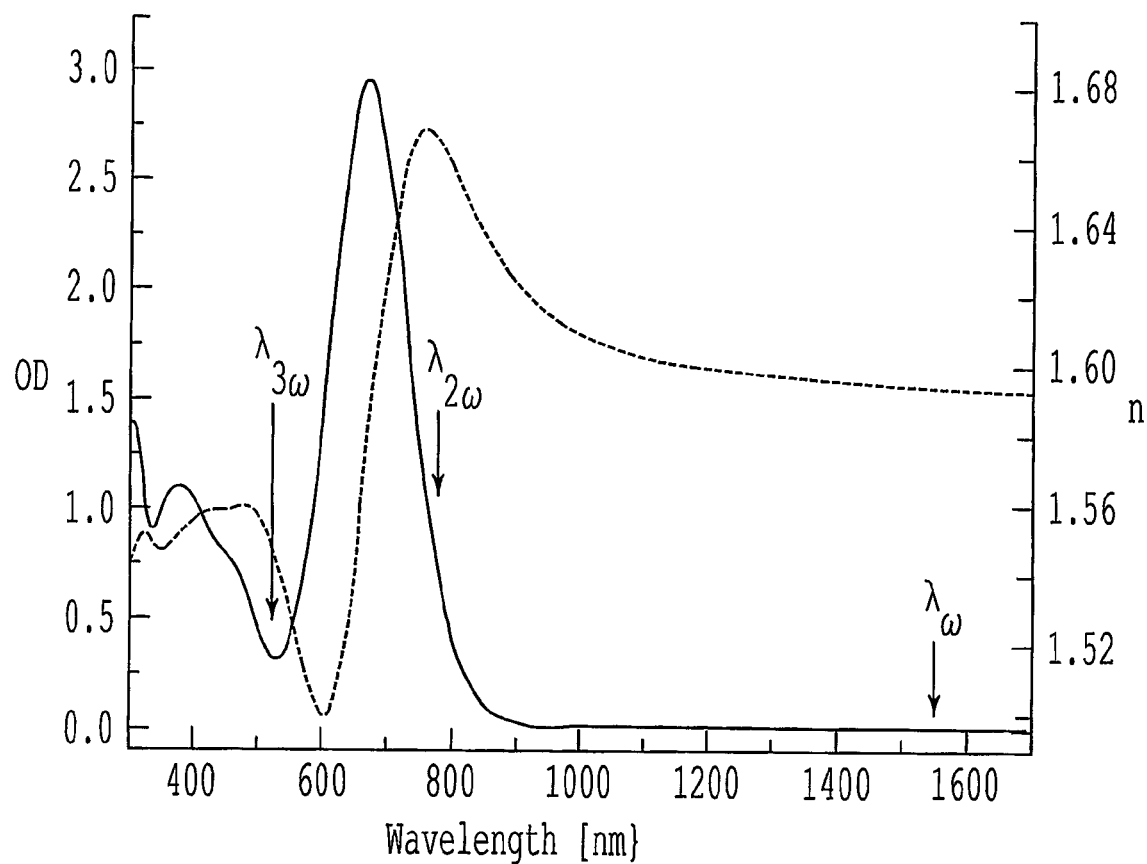
FIG. 2A is a graph of an absorption spectrum (solid line) and calculated index dispersion (dotted line) from a thin film chromophore sample of the present invention.

FIG. 2A is a graph of an absorption spectrum (solid line) and calculated index dispersion (dotted line) from a thin film chromophore sample of the present invention. Shown in FIG. 2A is also a calculated index dispersion (dotted line) obtained from the measured absorption spectrum. The absorption spectrum is derived by Kramers-Krönig relationships in which the refractive index of the optical material was matched in the calculation to a refractive index measured at 1550 nm by a prism coupler (Metricon, Model 2010, Pennington, N.J.). The arrows shown on FIG. 2A indicate spectral positions of a fundamental telecommunication laser signal (i.e. a pump wave at 1550 nm in this example), of a wavelength corresponding to twice the pump wave energy, and of a wavelength corresponding to a third-harmonic signal at thrice the pump wave energy, respectively.

According to the present invention, a prominent third-harmonic signal is produced when the wavelength at twice the photon energy is nearly resonant with the one-photon absorption band of the organic material. As depicted in FIG. 2A, the absorption band centered at 680 nm is nearly resonant with twice the pump wave frequency. Time-dependent perturbation theory as described by Boyd et al. in Nonlinear Optics, Academic Press, San Diego 1992, the entire contents of which are incorporated herein by reference, has been applied by the inventors of the present invention to determine that a resonance effect at the second-harmonic absorption band enhances the generation of a third-harmonic signal. For example, calculations by the inventors of the present invention show that the corresponding third-order susceptibility tensor elements in the time-dependent perturbation theory contain terms that are inversely proportional to $(\hbar\omega_0 - 2\hbar\omega)$, where $\hbar\omega_0$ is the photon energy corresponding to the absorption band, and $\hbar\omega$ is the photon energy of the fundamental laser pulse. A relatively weak absorption of the sample on the high-energy side of the absorption band where the signal is generated contributes to the strong third-order harmonic signal.

Thus, according to the present invention, a suitable optical material of the present invention includes for example an organic polymer which has an absorption mode at twice the optical pumping frequency and which exhibits low absorption at thrice the optical pumping frequency. FIG. 2A typifies a spectrum of an organic polymer suitable for third harmonic generation at 517 nm from a pump wave of 1550 nm. Indeed, under optical excitation with a single pump wave beam at 1550 µm, typical of wavelengths used for the telecommunications (1.4-1.6 µm), a strong visible third-harmonic signal (i.e. green light) is observed even by naked eye in the presence of standard laboratory lighting conditions.

Figure 2B:
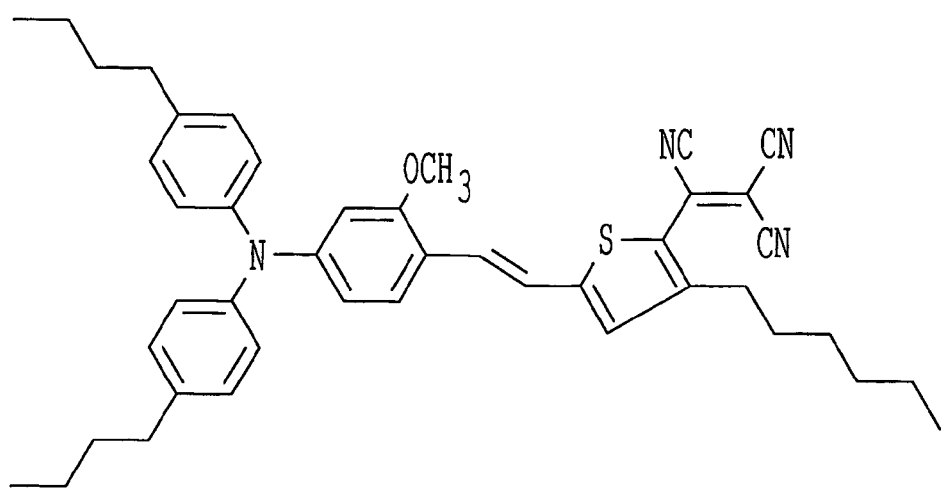
FIG. 2B is a depiction of the molecular structure of a chromophore utilized in the present invention.

The organic thin film utilized for demonstration of the present invention includes as shown in FIG. 2B a polymer composite having a push-pull chromophore (e.g., 2-tricyanovinyl 3-hexyl-5-(4-N,N'diphenyl-4-dibutyl vinyaniline-thiophene). In one illustrative example demonstrated herein, the chromophore was doped into a polymer host, and a matrix of polystyrene and a doping level for the push-pull chromophore of about 20 wt. % was utilized. Samples utilized for illustration of the present invention were prepared in air by first dissolving the guest chromophore and the host polymer matrix in chloroform and by stirring. Then, the solvent was removed under reduced pressure by a rotary evaporator yielding a solid material. The solid polymer composite was sandwiched between two glass slides and melted on a hot plate at 170° C. Thickness of the sample was controlled by calibrated spacers. The samples were then encapsulated by applying epoxy around the edges of the glass slides. The films displayed excellent optical qualities and showed negligible light scattering at visible and at near infrared wavelengths. Shelf lifetimes of at least several months were realized. According to the present invention, comparable results are realizable in other suitable polymer matrices and at different doping levels.

In one embodiment of the present invention, push-pull chromophores are utilized in the optical material. Push-pull chromophores have been described by Thayumanavan et al. in J. Org. Chem. 64, 4289 (1999), the entire contents of which are incorporated herein by reference. Specifically, Thayumanavan et al. describe a push-pull chromophore composed of 2-tricyanovinyl 3-hexyl-5-(4-N,N' diphenyl-4-dibutyl)vinyaniline-thiophene which are applicable to the present invention.

Accordingly, in one preferred embodiment of the present invention, the molecule is defined as:

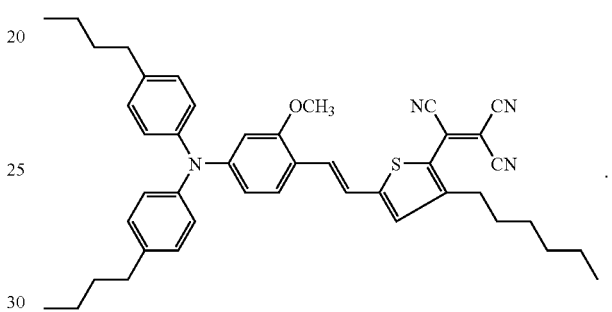

In another preferred embodiment of the present invention, the molecule is defined as:

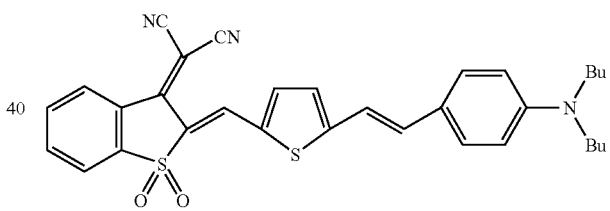

Accordingly, the optical material including the chromophores listed above can be a polymer which is optically transparent. The polymer can be an amorphous glass. The molecules in the optical material can be attached as a side-chain to the polymer. The molecules in the optical material can be in a main chain of the polymer. The molecules in the optical material can be incorporated in a dendrimer. Chromophores in general contain donor and acceptor groups. As described by Marder et al., U.S. Pat. No. 6,090,332, the entire contents of which are incorporated herein by reference, a number of functional groups are available as donor and acceptor groups. For example, the acceptor groups of the optical material of the present invention can include any atom or group of atoms with a high electron affinity that can be bonded to a π (pi)-conjugated bridge. Exemplary acceptors, in order of increasing strength, are:

where R can be any one of an alkyl, aryl, and carbazole group.

Other acceptors suitable for the present invention include:

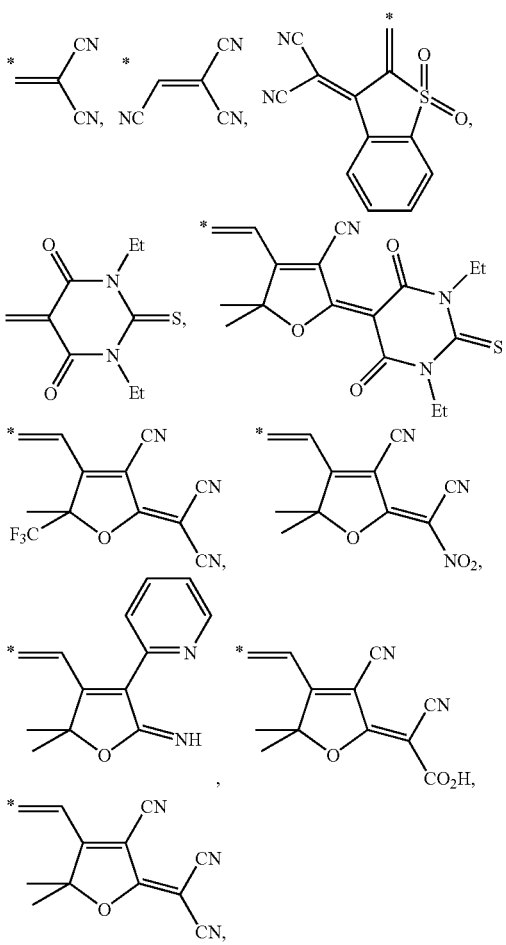

where * indicates the point of attachment of the accept to the π bridge via a single bond.

Similarly, the donor groups of the optical material of the present invention can include any atom or group of atoms with a low ionization potential that can be bonded to a π (pi)-conjugated bridge. Exemplary donors, in order of increasing strength, are:

where R can be any one of an alkyl, aryl, and carbazole group.

Dendrimers, arboroles, starburst polymers and hyperbranched polymers are terms for polymeric structures which have a branched structure and a high functionality. These structures have been described in different variants for many classes of polymeric compounds, for example for polyamines, polyamides, polyethers, polyesters, polyphenylenes and polysiloxanes. A comprehensive review of this field is given, for example, in E. Malmstrbom and A. Hult, J. M. S.-Rev. Macromol. Chem. Phys., 1997, C 37(3), 555-579 and in Dendritic Molecules, R. Newkome, C. N. Moorefield and F. Vogtle, Verlag Chemie, Weinheim 1996, the entire contents of which are incorporated herein by reference. The preparation of such compounds is described, for example, in R. Spindler and J. M. J. Frechet, Macromolecules 1992, 4809-4813, the entire contents of which are incorporated by reference.

Incorporation of chromophores in dendrimers can be advantageous for the present invention because the dendrimer can shield the chromophore through steric interactions thereby precluding chromophore-chromophore interactions which can modify the optical properties in a detrimental manner.

One particularly convenient and effective method of forming the optical material of the present invention involves dispersing the chromophores in a polymeric or prepolymeric binder. The chromophores can be mixed into the binder or grafted onto the polymer, prepolymer or monomer. Suitable binders include polystyrene, polyacrylonitrile, polymethacrylate, poly(methyl methacrylate), poly(vinyl alcohol), copolymers of methyl methacrylate and methacrylic acid, copolymers of styrene and maleic anhydride and half ester-acids of the latter, as well as many others. It is preferred that the polymeric binder be highly transparent so that the transparency of the molecules utilized in the practice of this invention can be advantageously employed.

One common form an optical material, according to the present invention, is that of a Langmuir-Blodgett (LB) film. As known to those skilled in the art, a small amount of a molecule useful in the practice of this invention, when spread on the surface of a liquid, forms a surface film of monomolecular thickness at the air/liquid interface. When the supporting substrate is slowly immersed in the film bearing liquid body or slowly withdrawn from the liquid body, an oriented monomolecular film is formed on the substrate. The preparation and uses of Langmuir-Blodgett films are described in M. C. Petty, M. R. Bryce, D. Bloor, Introduction to Molecular Electronics, Edward, Arnold, London, 1995, Chapter 10, the entire contents of which are incorporated herein by reference.

Compositions, according to the present invention, are also useful when incorporated into solutions, prepolymers, polymers, Langmuir-Blodgett thin films, and self-assembled monolayers. The compositions can be advantageously modified in such a way as to allow for variation of ease of dissolution in a variety of host media, including liquids and polymeric hosts, by changing the nature of the substituents attached to the central conjugated bridge framework of the molecule as well as by changing either the donors or acceptors. In addition, by controlling the length and composition of the π-bridge of the molecule, it is possible to control the position and strength of the absorption bands.

In one example of an autocorrelator of the present invention, an optical parametric oscillator emits pulses that are tunable from 1.4 to 1.6 μm and emits pulses at a rate of 82 MHz and a typical duration of 90 fs into an optical cell. The optical cell in this example includes an organic polymer push-pull chromophore film such as for example depicted in FIG. 2B. Autocorrelation measurements were performed in the set-up depicted in FIG. 1A in which a relative optical pass length and hence time delay were modulated by a piezoelectric PZT crystal at a frequency of 0.2 Hz. Two co-propagating beams were focused with a 4 cm lens (e.g. lens 20) onto an organic thin film of the push-pull chromophore being sandwiched in this illustrative example between two glass slides. For autocorrelation measurements, a third-harmonic signal was collected by lens 24 and focused on the detector 26 (e.g., a standard non-amplified silicon photodetector). The standard non-amplified silicon detector is sensitive to the third harmonic emission at ~500 nm and relatively insensitive to the incident optical pulse wavelength of 1.4 to 1.6 μm.

Figure 1B:
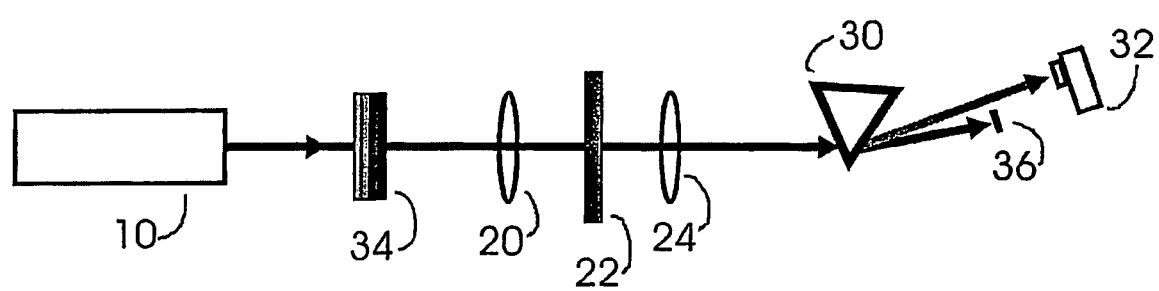
FIG. 1B is a depiction of an optical apparatus to detect third harmonic generation from a thin film chromophore sample of the present invention.
Figure 3A:
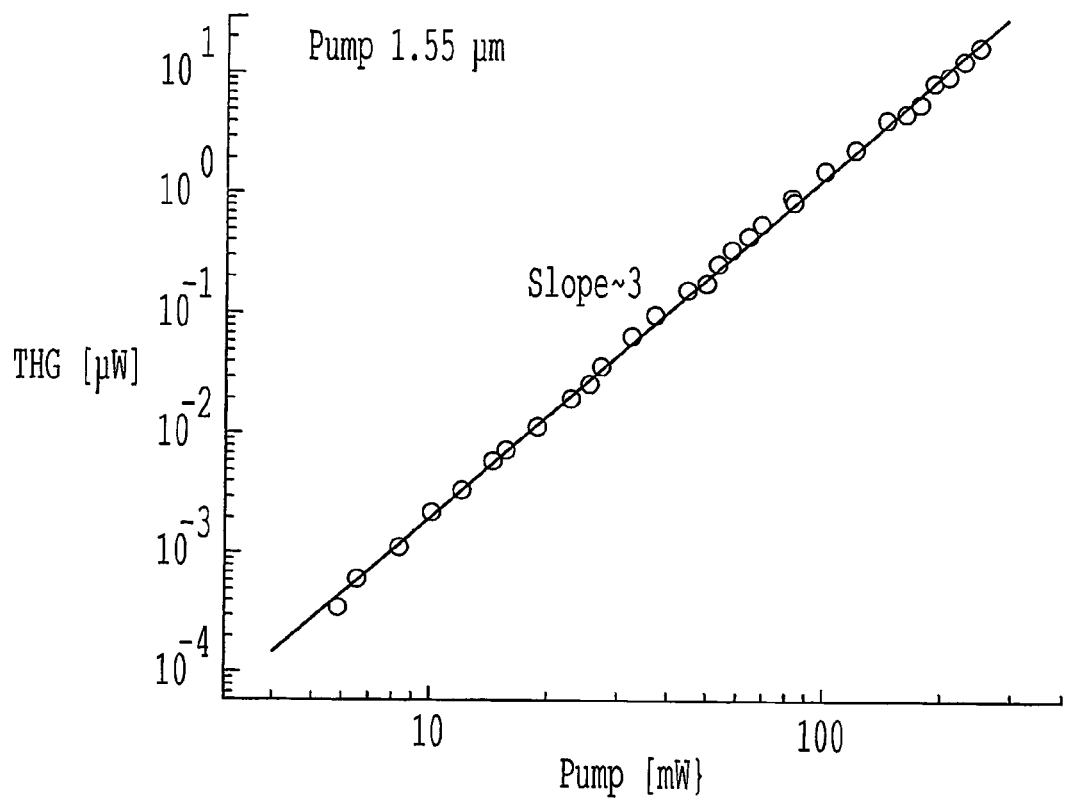
FIG. 3A is a graph of a third-harmonic signal power measured from a 10-μm-thick chromophore sample as a function of the input fundamental power at 1550 nm.

As shown for example in FIG. 1B, detection of the third harmonic signal can be made according to the present invention in a non-interferrometric technique by spatially separating the fundamental optical pulse from the third harmonic signal by a prism 30 and detecting the third harmonic signal in a photomultiplier 32. For spectrally resolved experiments, a portable fiber spectrometer can be used instead of a prism. In this case, the setup depicted in FIG. 1B is used to estimate the conversion efficiency of the third harmonic generation (THG) process. To do this, the output of the source 10 is focused by lens 20 into the optical material 22. The third harmonic generated from the material is collected by lens 24 and becomes incident on the prism 30. Refraction in the prism separates the fundamental frequency of the pump wave λ from the third harmonic such that the third harmonic light λ/3 is diverted to the photomultiplier 32 and the fundamental frequency light is passed to an optical stop 36. The set of filters 34 at the output the source 10 is used to vary the incident intensity on the optical material 22. For each pump intensity onto the material, the third harmonic intensity is registered with the photomultiplier 32. In this way, a relationship the intensity at the fundamental wavelength and the intensity at the third harmonic is obtained, as it is shown in FIG. 3a.

Optimization of the third-harmonic signal power can be accomplished, according to the present invention, by varying the chromophore concentration and the film thickness. Increasing the concentration of chromophores, leads to a stronger nonlinearity of the films but at the same time increasing the concentration of chromophores decreases the absorption depth (the inverse of absorption coefficient) for the third-harmonic signal. Likewise, an increase of the sample thickness, leads to a more efficient nonlinear signal generation, but at the expense of higher re-absorption. The coherence, due to the phase mismatch between optical waves traveling at different velocities in the optical sample, is a consideration in setting a thickness of the optical sample of the chromophores. For example, based on the index calculations from the index values shown in FIG. 2A, the coherence length of a sample with 20 wt. % of chromophore was calculated to be 5.8 μm. This value is compared with an absorption depth of 3.1 μm in such a sample at the third harmonic. Thus, samples of a few micrometers in thickness, according to the present invention, provide efficient nonlinear signal generation.

In one preferred embodiment of the present invention, amorphous organic thin films of the chromophores exhibit efficient third-harmonic generation (THG) in the microwatt-level when pumped with unamplified ultrafast pulses at telecommunication wavelengths. The generated third-harmonic light provides an autocorrelation characteristic of the pump laser pulse. Accordingly, an autocorrelator of the present invention has several advantages:

i) the third-harmonic signal is sufficiently strong so that the third-harmonic signal can be detected with a standard unamplified silicon detector making autocorrelation practical and lower cost, ii) by producing high signal levels (i.e. at microwatt levels) of the third harmonic signal, simultaneous measurement of the third harmonic signal and the laser pulse spectrum is possible with compact and portable low cost fiber spectrometers, iii) sample thicknesses of a few micrometers for the thin film chromophore samples of the present invention limit potential distortions caused by geometric, dispersive, and phase-mismatch effects, iv) the organic polymer materials of the present invention are isotropic making the autocorrelator polarization insensitive, and v) microwatt level third harmonic generation signals are produced without the use of phase matching or without the use of cascading quadratic nonlinear effects, permitting the autocorrelator of the present invention to provide tuning and operation over a broad wavelength range.

Figure 3B:
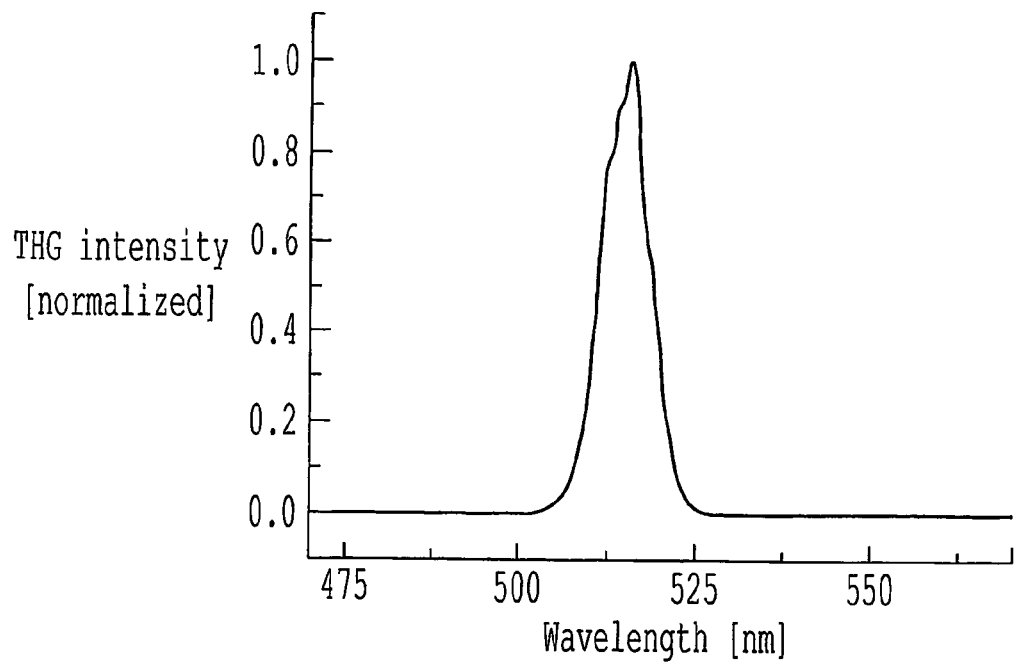
FIG. 3B is a spectral graph of a third-harmonic signal measured from a 10-μm-thick chromophore sample of the present invention taken by a fiber spectrometer.

The nonlinearity of the chromophore organic films of the present invention was determined by measurement of the third-harmonic signal power in a single beam experiment as a function of the pump power. FIGS. 3A and 3B show the results measured from a 10 μm-thick chromophore film. FIG. 3A shows that the signal has a cubic dependence on the incident power At a pump power of 250 mW, a third-harmonic signal of 17 μW was generated. With the third-order autocorrelator described herein, the nonlinear signal power is sufficient so that a spectrum of the third order harmonic can be measured with a low cost spectrometer such as for example a compact and portable fiber spectrometer. FIG. 3B is a spectral graph of a third-harmonic signal produced from the chromophore sample as measured by a fiber spectrometer.

From the measured spectrum, an estimation of the magnitude of the third-order susceptibility of the optical materials of the present invention can be made using a plane wave approximation. Assuming for the sake of calculation no depletion of the fundamental and neglecting the reflection effects from the interface planes, the output third harmonic electric field amplitude can be written as:

$$E_{3\omega} = \frac{1}{4}\chi^{(3)}(-3\omega;\omega,\omega,\omega)E_\omega^3\left[\frac{1-\exp(i\Delta kL)}{n_{3\omega}^2-n_\omega^2}\exp(ik_{3\omega}L)\right] \quad (1)$$

where E represents the electric field amplitude of the optical wave, n is the complex refractive index, k the complex wavevector, L the sample thickness, and the subscripts ω and 3ω refer to quantities defined for the fundamental, and the third-harmonic frequencies, respectively. $\Delta k(\equiv k_{3\omega}-3k_\omega)$ is the wavevector mismatch associated with this process. By fitting the data of FIG. 3 to Eq. 1, a susceptibility value $\chi^{(3)}=8.2\times10^{-20}$ (m/V)$^2$ (or $5.8\times10^{-12}$ esu) is derived.

Figure 4:
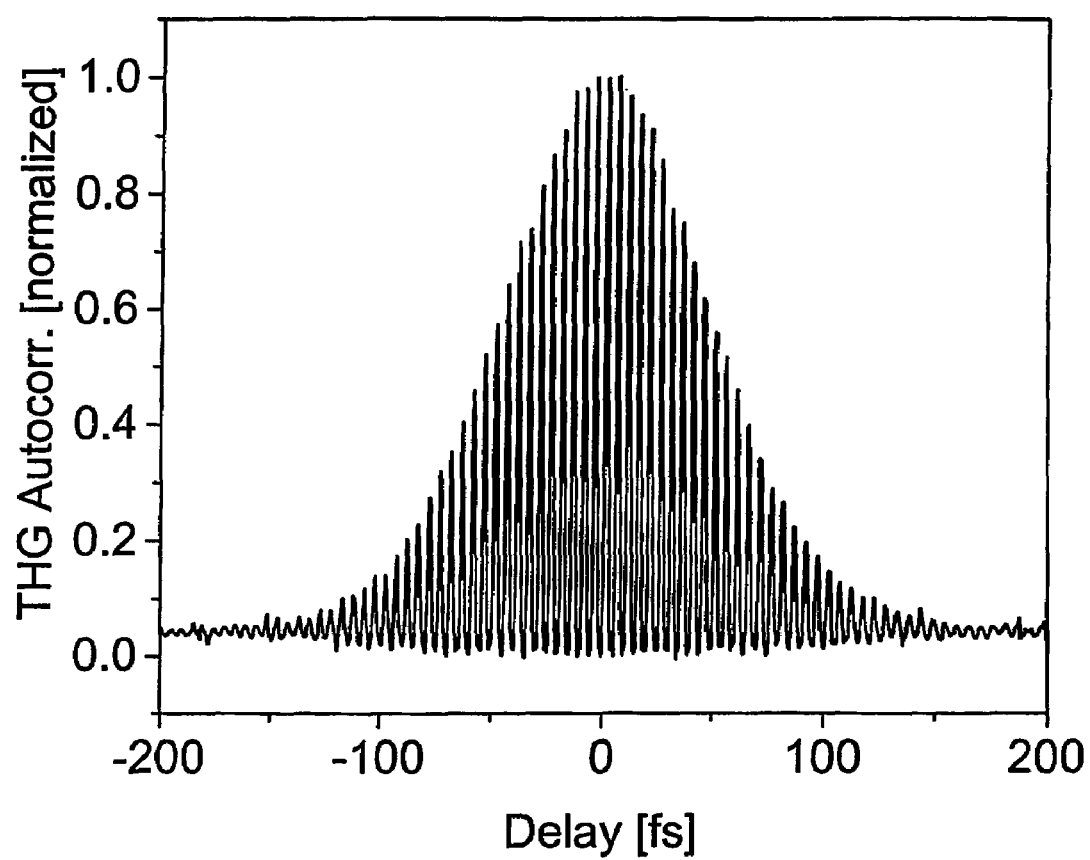
FIG. 4 is a depiction of an interferometric autocorrelation trace measured from the third-harmonic signal of thin film chromophore sample of the present invention.

FIG. 4 shows a real-time third-order interferometric autocorrelation trace using an optical material film of the present invention having a thickness of 10 μm. The interferometric autocorrelation trace used the optical apparatus depicted in FIG. 1A with an input optical source providing 60 mW, which after Fresnel losses in the beam splitter is reduced to 22 mW as input to the optical material. In FIG. 4, a signal to background ratio of 32:1 distinctive of third-harmonic generation autocorrelations is shown. Assuming that the pulses have a Gaussian shape, a deconvolution of the third-order autocorrelation yields a pulse of 93 fs (full width at half maximum FWHM). The spectral width of the incident pulses was 36 nm (FWHM), indicating that the pump wave pulses were nearly Fourier transform-limited. For comparison purposes, a second-order autocorrelation was performed by replacing the organic film with a 500 μm-thick β barium borate crystal used as a second harmonic generator in this case. An identical pulsewidth was obtained.

Figure 5:
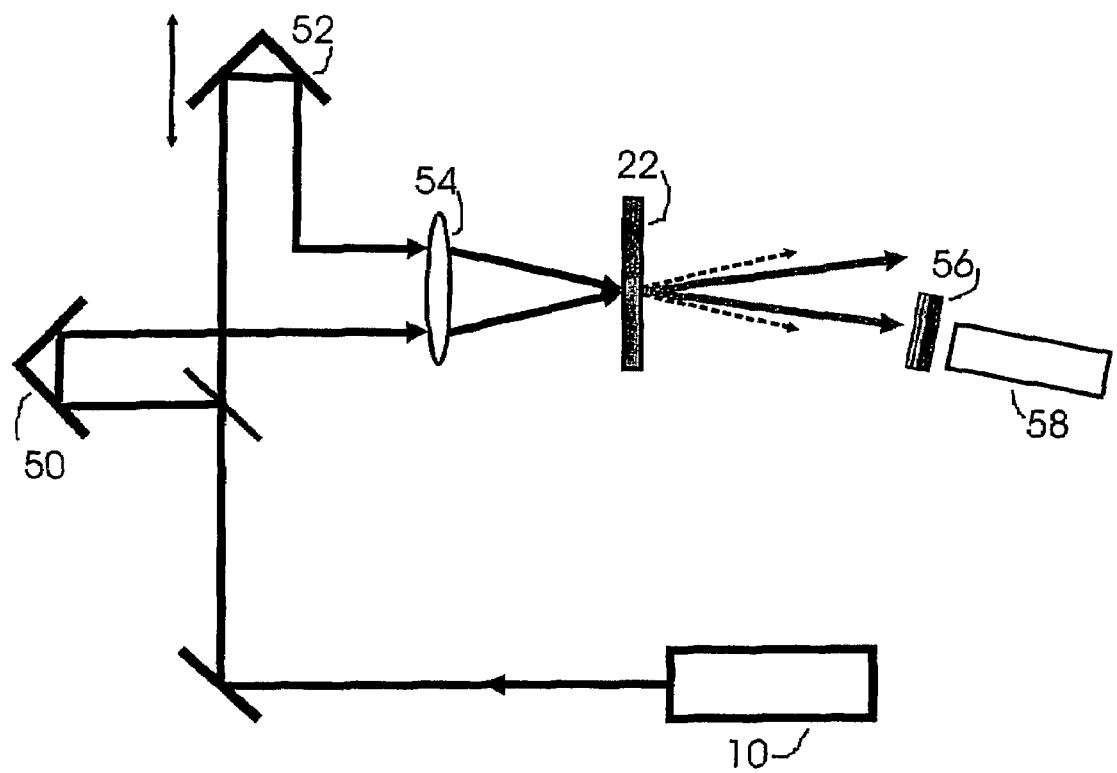
FIG. 5 is a schematic of an optical apparatus according to the present invention suitable for frequency resolved optical gating providing a spectrally resolved autocorrelation of an optical pulse by producing a third order harmonic light from a thin film chromophore sample of the present invention.

The high sensitivity of the autocorrelator of the present invention makes this autocorrelation suitable for full characterization of ultrafast pulse using time-frequency domain technique such as FROG using low cost portable fiber spectrometers. One such arrangement is shown in FIG. 5. FIG. 5 is a schematic of an optical apparatus suitable for frequency resolved optical gating. As shown in FIG. 5, an optical source 10 generates an optical pulse. The optical pulse is divided into two parts, each of which are incident on retroreflectors 50 and 52. Movement of for example retroreflector 52 provides a time delay between the divided optical pulses. The divided pulses are focused by lens 54 into the optical material generating third harmonic light which is collected through a neutral density filter 56 into a spectrometer 58 such as a fiber spectrometer.

Figure 6:
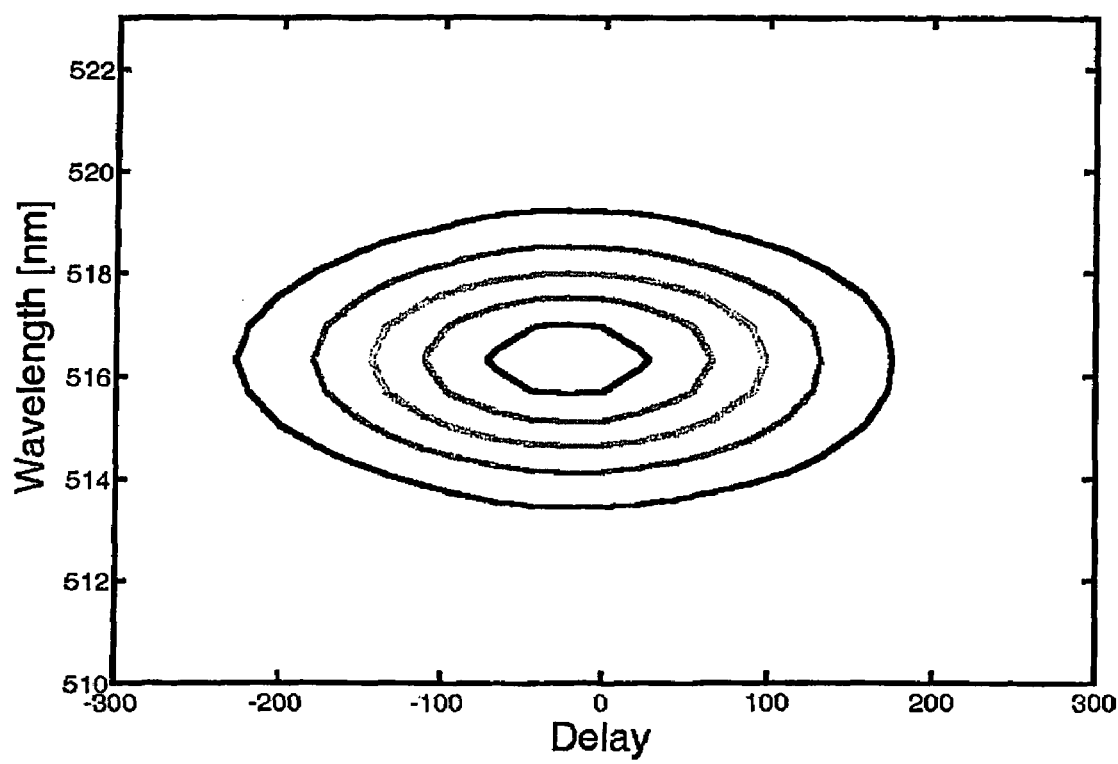
FIG. 6 is a depiction of a frequency resolved optically gated spectrum taken according to the present invention from a thin film chromophore sample of the present invention.

FIG. 6 is a depiction of a frequency resolved optically gated spectrum taken according to the present invention. FIG. 6 shows wavelength contours (of increasing amplitude intensities to the center) as a function of the delay time adjusted by movement of the retroreflector 52. As known in the art, from the contour density plot, optical phase and pulse width can be ascertained using techniques similar to those described by Trebino et al. As an example, FIG. 6 shows a spectrally resolved autocorrelation signal taken with the fiber spectrometer for delay steps of 13 fs. This FROG trace is arranged in a grid of N×N (64×64 for the specific example here shown) data points from which the optical phase and pulse can be retrieved. The retrieval of the phase is based in the application of an algorithm which perform iterative Fourier transform analysis. Details of the reconstruction algorithm can be found in the Trebino et. al. review of the FROG technique. The use of the optical material of the present invention leads to a very high sensitive FROG apparatus.

Figure 7:
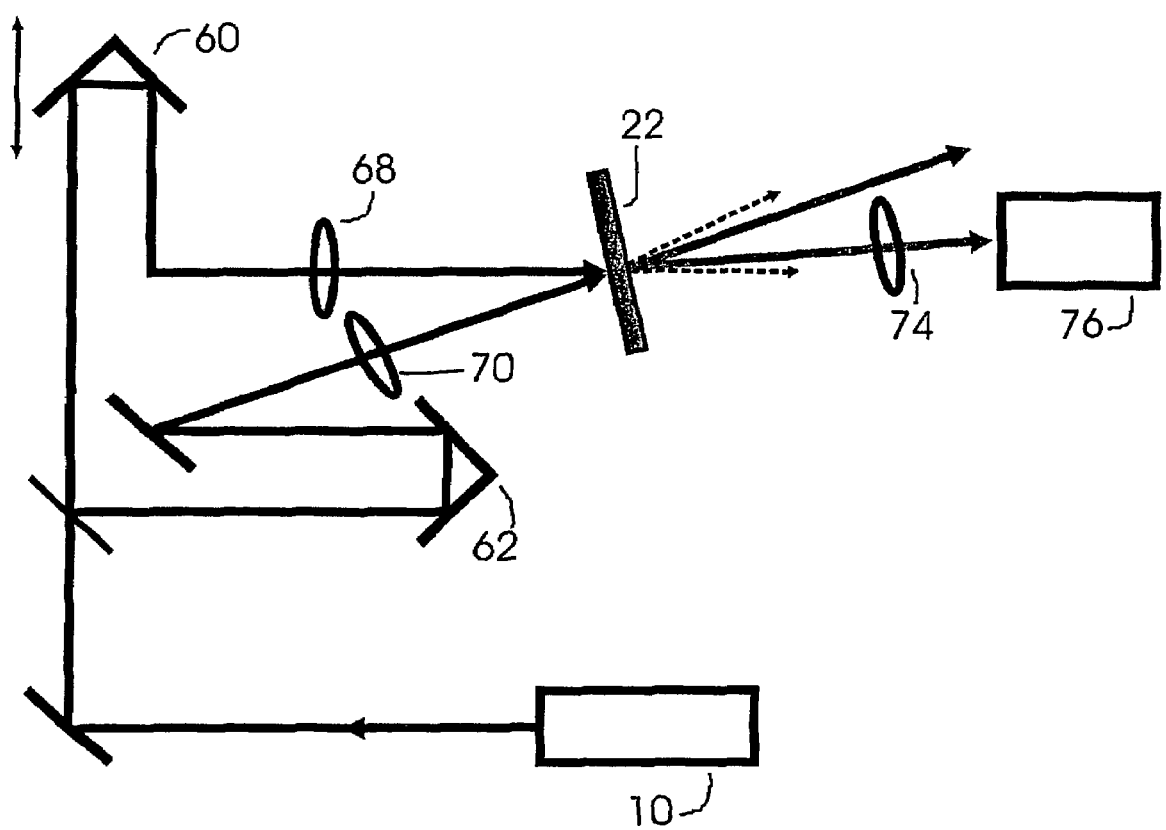
FIG. 7 is a schematic of an optical apparatus in a non-collinear geometry according to the present invention utilizing third harmonic generation to produce from a thin film chromophore sample of the present invention a correlation to an optical pulse.

FIG. 7 is a schematic of another optical apparatus according to the present invention utilizing third harmonic generation to produce a correlation to the optical pulse in a non-collinear geometry. As shown in FIG. 7, an optical source 10 generates an optical pulse. The optical pulse is divided into two parts, one of which is incident on a retroreflector 60, movement of which provides a time delay between the divided optical pulses, and the other of which passes to a retroreflector 62. The divided pulses are separately focused by lenses 68 and 70 into the optical material 22 thereby generating third harmonic light which is collected by lens 74 into a spectrometer 76. In this case, the two parts of the divided optical pulse thus enter the optical material in phase, but due to the diverging angle the interaction occurs throughout the breadth of the sample simultaneously. Third harmonic light collected from the sample thus shows a response from which optical properties of the pulse can be derived in a similar manner as described above.

Figure 8:
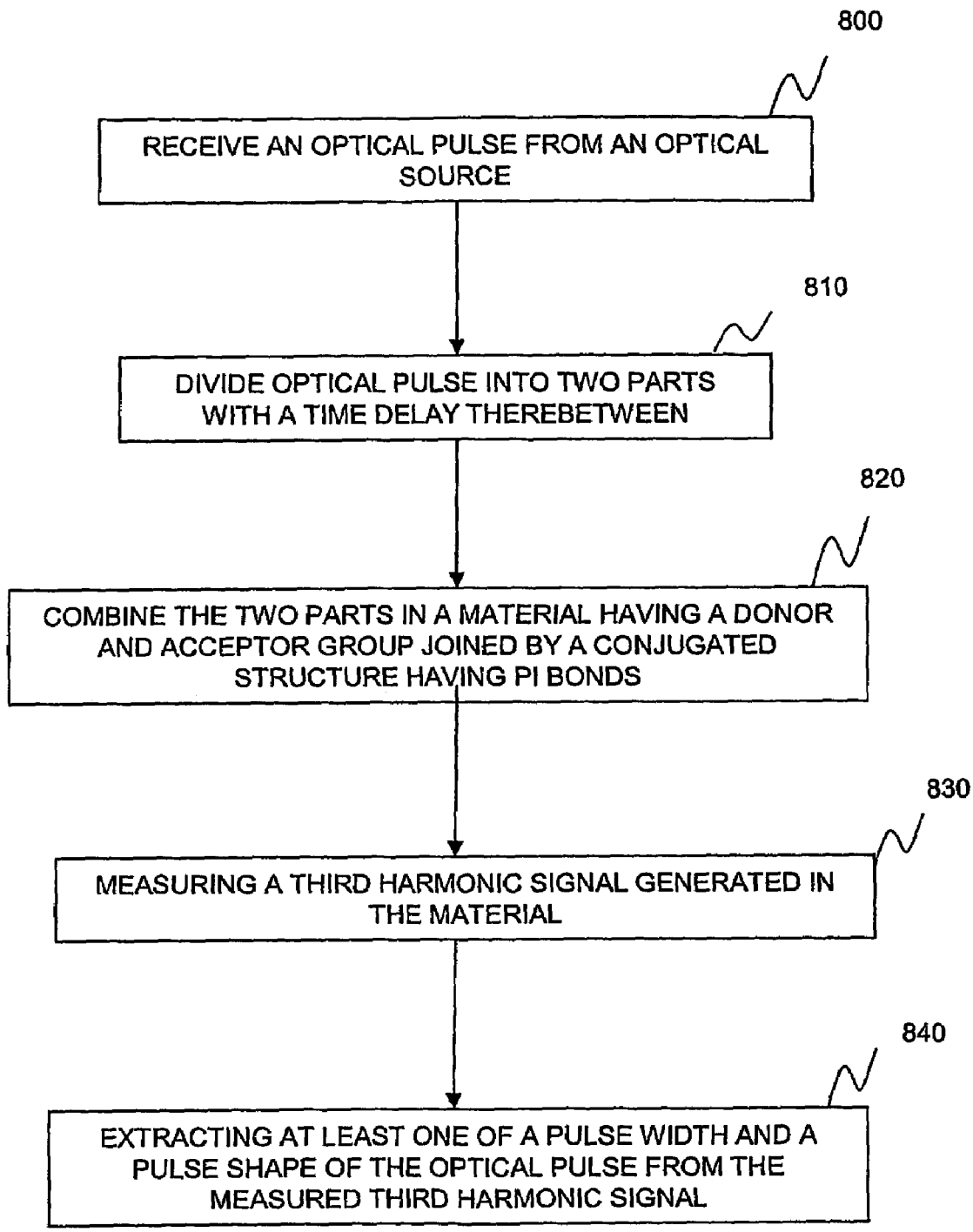
FIG. 8 is a flow chart depicting one method of the present invention.

Thus in general, the present invention involves optical apparatuses and methods which as shown illustratively in FIG. 8 perform the following steps. In step 800, an optical pulse of a wavelength of λ is received from an optical source. In step 810, the optical pulse is divided into two parts to produce a time delay between each part. In step 820, the two parts of the optical pulse are combined in a material (i.e. an optical material) including a molecule having a formula D-Π-A, where D is an electron donor group, A is an electron acceptor group, and Π is a conjugated structure having π bonds that connect the D donor group to the A acceptor group. The molecule exhibits an absorption band at a wavelength $\lambda_0$ and exhibits a weakly absorbing region as compared to the absorption band at $\lambda_0$ at a wavelength $\lambda_1$. In general, $\lambda_1<\lambda_0$, λ/2 has a value about $\lambda_0$, and λ/3 has a value about $\lambda_1$. In step 830, a third harmonic signal at λ/3 is measured as a function of the time delay between the two parts of the optical pulse. In step 840, at least one of a pulse width and a pulse shape for the optical pulse is extracted from a third harmonic signal. For example, at least the pulse width can be extracted from the autocorrelation trace, and at least the phase and shape pulse can be extracted from the spectrally resolved autocorrelation trace.

Step 820 can combine the two parts of the optical pulse by propagating the two parts of the optical pulse linearly in the optical material. Step 820 can combine the two parts of the optical pulse in a polymer, an amorphous glass of the polymer, a material in which the molecule is attached as a side-chain to the polymer, a material in which the molecule is in a main chain of the polymer, a material in which the molecule is incorporated in a dendrimer.

Step 820 can combine the two parts of the optical pulse in an optically transparent polymer at the wavelength λ of the optical pulse. The molecule can include the above noted chromophores. Step 820 can combine the two parts of the optical pulse in a material in which the weakly absorbing region has an absorption coefficient less than 10,000 $cm^{-1}$. The material can be a polymer which is transparent at 1550 nm, absorbing at 775 nm, and weakly absorbing at 517 nm as compared to 775 nm. Step 820 can combine two parts of the optical pulse such having equal intensities.

Step 840 can extract, from a temporal waveform of the third harmonic autocorrelation signal generated from a laser pulse, a pulse width and/or pulse duration for pulsed telecommunications lasers or other ultra-fast lasers having pulse widths of less than 100 picoseconds. Step 840 can determine a phase of the optical pulse from a measured spectrally resolved third harmonic autocorrelation signal.

Step 820 an combine the two parts of the optical pulse non-collinearly and combine the two parts such that the phases are matched. As such, a plurality of third harmonic signals are generated propagating in different directions from an incident direction of the two parts of the optical pulse. A spectrum of one of the plurality of third harmonic signals as a function of the delay between the two parts of the optical pulse can be measured. From the measured spectrum, a phase of the optical pulse can be determined.

Numerous modifications and variations of the present invention are possible in light of the above teachings. It is therefore to be understood that within the scope of the appended claims, the invention may be practiced otherwise than as specifically described herein.

The invention claimed is:

1. A method for producing a third harmonic signal from a laser light of wavelength λ, comprising:

irradiating said laser light on a material including a molecule having a formula D-Π-A, where D is an electron donor group, A is an electron acceptor group, and Π is a conjugated structure having π bonds that connect the D donor group to the A acceptor group, said molecule exhibiting an absorption band at a wavelength $\lambda_0$ and exhibiting a weakly absorbing region as compared to the absorption band at $\lambda_0$ at a wavelength $\lambda_1$, such that $\lambda_1<\lambda_0$;

adjusting the wavelength λ of said laser light such that λ/2 has a value of about $\lambda_0$ and λ/3 has a value of about $\lambda_1$, thereby generating said third harmonic signal.

2. The method of claim 1, wherein said irradiating comprises:

interacting two time delayed optical pulses of the laser light in the material to thereby generate said third harmonic signal.

3. The method of claim 1, wherein said irradiating comprises:

dividing the laser light into a first part and a second part;
time delaying the first part relative to the second part;
recombining the first and second parts; and
focusing the time-delayed and recombined parts into the material to thereby generate said third harmonic signal.

4. The method of claim 1, wherein said irradiating comprises:

irradiating said material having a molecule defined by the formula:

5. The method of claim 1, wherein said irradiating comprises:

irradiating said material having a molecule defined by the formula:

6. The method of claim 1, wherein said irradiating comprises:

irradiating a polymer of said molecule.

7. The method of claim 6, wherein said irradiating comprises:

irradiating an amorphous glass of said polymer.

8. The method of claim 6, wherein said irradiating comprises:

irradiating said material in which said molecule is attached as a side-chain to said polymer.

9. The method of claim 6, wherein said irradiating comprises:

irradiating said material in which said molecule is in a main chain of said polymer.

10. The method of claim 6, wherein said irradiating comprises:

irradiating said material in which said molecule is incorporated in a dendrimer.

11. The method of claim 1, wherein said irradiating comprises:

irradiating an optically transparent polymer at the wavelength λ of the laser.

12. The method of claim 1, wherein said irradiating comprises:

irradiating said material in which said molecule includes a chromophore.

13. The method of claim 1, wherein said irradiating comprises:

irradiating said material in which said weakly absorbing region has an absorption coefficient less than 10,000 $cm^{-1}$.

14. The method of claim 1, wherein said irradiating comprises:

irradiating said material in which a polymer of said molecule is transparent at 1550 nm, absorbing at 775 nm, and weakly absorbing at 517 nm as compared to 775 mn.

15. The method of claim 1, wherein said irradiating comprises:

irradiating said material having said donor group comprising at least one of atoms or molecular groups having a low ionization potential.

16. The method of claim 1, wherein said irradiating comprises:

irradiating said material having said donor group comprising at least one of I, Br, Cl, F, OC(O)R, SH, OH, SR, OR, NHC(O)R, $NH_2$, NHR, $NR_2$, $S^-$, and $O^-$, where R is any one of an alkyl, aryl, and carbazole group.

17. The method of claim 1, wherein said irradiating comprises:

irradiating said material having said acceptor group comprising at least one of atoms or molecular groups having a high electron affinity.

18. The method of claim 1, wherein said irradiating comprises:

irradiating said material having said acceptor group comprising at least one of:

$C(O)NR_2$, C(O)NHR, $C(O)NH_2$, C(O)OR, C(O)OH, C(O)R, C(O)H, CN, $S(O_2)R$, and $NO_2$, where R is any one of an alkyl, aryl, and carbazole group.

19. The method of claim 1, wherein said irradiating comprises:

irradiating said material having said acceptor group comprising at least one of:

-continued

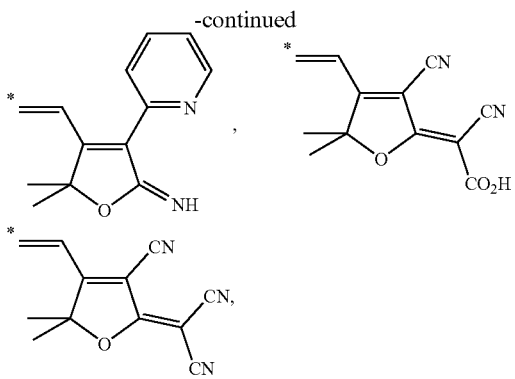

where * indicates the point of attachment of the accept to a π bridge via a single bond.

20. A method for measuring an optical pulse, comprising:
receiving the optical pulse of a wavelength of λ from a source;
dividing the optical pulse into two parts to produce a time delay between each part;
combining the two parts of the optical pulse in a material including a molecule having a formula D-Π-A, where D is an electron donor group, A is an electron acceptor group, and Π is a conjugated structure having π bonds that connect the D donor group to the A acceptor group, said molecule exhibiting an absorption band at a wavelength $\lambda_0$ and exhibiting a weakly absorbing region as compared to the absorption band at $\lambda_0$ at a wavelength $\lambda_1$, such that $\lambda_1 < \lambda_0$ that $\lambda/2$ has a value of about $\lambda_0$ and that $\lambda/3$ has a value of about $\lambda_1$;
measuring a third harmonic signal at $\lambda/3$ as a function of the time delay between the two parts of the optical pulse;
extracting from said third harmonic signal as a function of the time delay at least one of a pulse width and a pulse shape correlated with the optical pulse.

21. The method of claim 20, wherein said combining comprises:
propagating the two parts of the optical pulse linearly in said material.

22. The method of claim 20, wherein said combining comprises:
irradiating said material having a molecule defined by the formula:

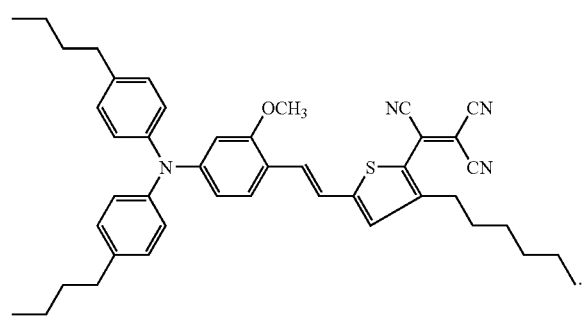

23. The method of claim 20, wherein said combining comprises:
irradiating said material having a molecule defined by the formula:

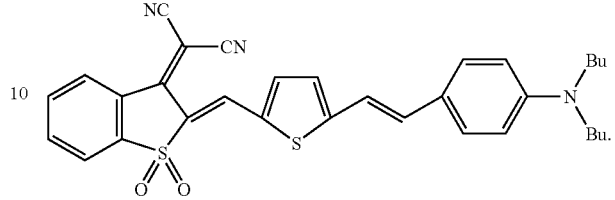

24. The method of claim 20, wherein said combining comprises:
irradiating a polymer of said molecule.

25. The method of claim 24, wherein said irradiating comprises:
irradiating an amorphous glass of said polymer.

26. The method of claim 24, wherein said irradiating comprises:
irradiating said material in which said molecule is attached as a side-chain to said polymer.

27. The method of claim 24, wherein said irradiating comprises:
irradiating said material in which said molecule is in a main chain of said polymer.

28. The method of claim 24, wherein said irradiating comprises:
irradiating said material in which said molecule is incorporated in a dendrimer.

29. The method of claim 20, wherein said combining comprises:
irradiating an optically transparent polymer at the wavelength λ of the optical pulse.

30. The method of claim 20, wherein said combining comprises:
irradiating said material in which said molecule includes a chromophore.

31. The method of claim 20, wherein said combining comprises:
irradiating said material in which said weakly absorbing region has an absorption coefficient less than 10,000 $cm^{-1}$.

32. The method of claim 20, wherein said combining comprises:
irradiating said material in which a polymer of said molecule is transparent at 1550 nm, absorbing at 775 nm, and weakly absorbing at 517 nm as compared to 775 nm.

33. The method of claim 20, wherein said combining comprises:
irradiating said material having said donor group comprising at least one of atoms or molecular groups having a low ionization potential.

34. The method of claim 20, wherein said combining comprises:
irradiating said material having said donor group comprising at least one of I, Br, Cl, F, OC(O)R, SH, OH, SR, OR, NHC(O)R, $NH_2$, NHR, $NR_2$, $S^-$, and $O^-$,
where R is any one of an alkyl, aryl, and carbazole group.

35. The method of claim 20, wherein said combining comprises:
irradiating said material having said acceptor group comprising at least one of atoms or molecular groups having a high electron affinity.

36. The method of claim 20, wherein said combining comprises:
irradiating said material having said acceptor group comprising at least one of C(O)NR$_2$, C(O)NHR, C(O)NH$_2$, C(O)OR, C(O)H, C(O)R, C(O)H, CN, S(O$_2$)R, and NO$_2$,
where R is any one of an alkyl, aryl, and carbazole group.

37. The method of claim 20, wherein said irradiating comprises:
irradiating said material having said acceptor group comprising at least one of:

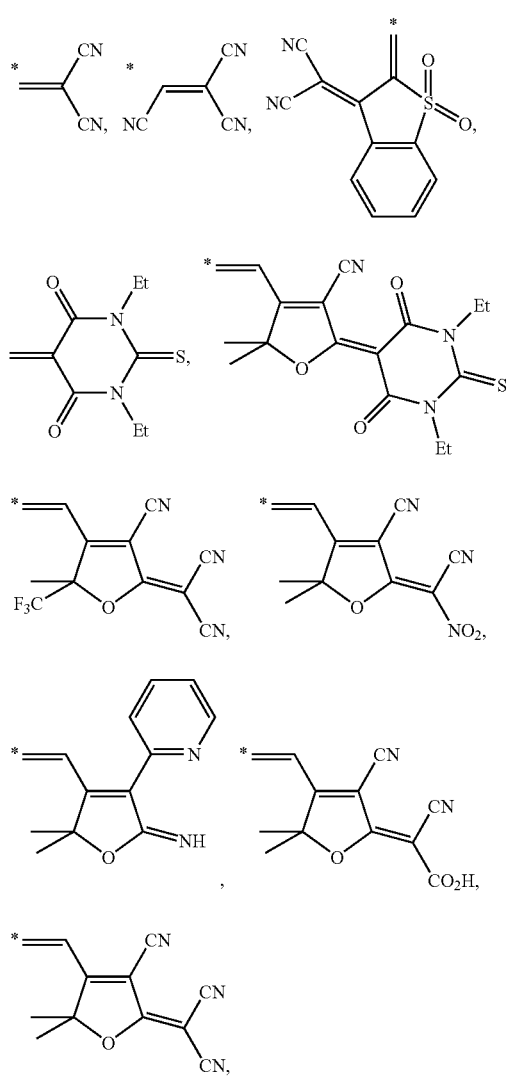

where * indicates the point of attachment of the accept to a π bridge via a single bond.

38. The method of claim 20, wherein said combining comprises:
combining the two parts of the optical pulse such that said two parts have equal intensities.

39. The method of claim 20, wherein said extracting comprises:
extracting a temporal waveform from a laser pulse.

40. The method of claim 39, wherein said extracting comprises:
extracting said temporal waveform from a pulsed telecommunications laser.

41. The method of claim 39, wherein said extracting comprises:
extracting said temporal waveform from ultra-fast lasers having a pulse width of less than 100 picoseconds.

42. The method of claim 20, wherein said combining comprises:
combining the two parts of the optical pulse non-collinearly and such that said two parts are phase matched.

43. The method of claim 42, wherein said combining comprises:
generating a plurality of third harmonic signals propagating in different directions from an incident direction of said two parts of the optical pulse;
measuring a spectrum of one of the third hannonie signals generated in said different directions as a function of the delay between the two parts of the optical pulse;
extracting from the measured spectrum as a function of the time delay a phase of the optical pulse.

44. The device of claim 20, wherein said extracting comprises:
determining a phase of said optical pulse from a spectrally resolved third harmonic signal as a function of the time delay.

45. A device for producing a third harmonic signal from an optical pulse of wavelength λ, comprising:
a material including a molecule, having a formula D-Π-A, where D is an electron donor group, A is an electron acceptor group, and Π is a conjugated structure having π bonds that connect the D donor group to the A acceptor group, said molecule exhibiting a strong absorption band centered at a wavelength $\lambda_0$ and exhibiting a weakly absorbing region as compared to the absorption band at $\lambda_0$ at a wavelength $\lambda_1$ such that $\lambda_1 < \lambda_0$;
a divider configured to receive the optical pulse from a source and divide the pulse into two parts to produce a time delay between each part;
a combiner configured to combine the two parts of the optical pulse having said time delay; and
an optical element configured to couple the time-delayed and combined two parts into the material to thereby generate the third harmonic signal.

46. The device of claim 45, wherein the molecule is defined by the formula:

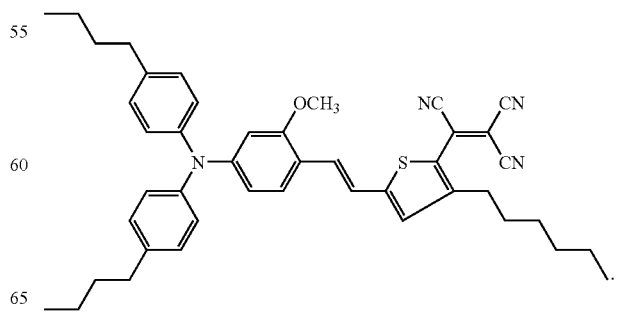

47. The device of claim 45, wherein the molecule is defined by the formula

48. The device of claim 45, wherein said material is an optically transparent polymer.

49. The device of claim 48, wherein said polymer is in an amorphous glass.

50. The device of claim 48, wherein said molecule is attached as a side-chain to said polymer.

51. The device of claim 48, wherein said molecule is in a main chain of said polymer.

52. The device of claim 48, wherein said molecule is incorporated in a dendrimer.

53. The device of claim 48, wherein said molecule includes a chromophore.

54. The device of claim 45, wherein said material in said weakly absorbing region has an absorption co-efficient less than 10,000 cm$^{-1}$.

55. The device of claim 45, wherein said molecule is transparent at 1550 nm, absorbing at 775 mn, and weakly absorbing at 517 nm as compared to 775 nm.

56. The device of claim 45, wherein said material having said donor group comprises:
   at least one of atoms or molecular groups having a low ionization potential.

57. The device of claim 45, wherein said material having said donor group comprises:
   at least one of I, Br, Cl, F, OC(O)R, SH, OH, SR, OR, NHC(O)R, NH$_2$, NHR, NR$_2$, S$^+$, and O$^+$, where R is any one of an alkyl, aryl, and carbazole group.

58. The device of claim 45, wherein said material having said acceptor group comprises:
   at least one of atoms or molecular groups having a high electron affinity.

59. The device of claim 45, wherein said material having said acceptor group comprises:
   at least one of C(O)NR$_2$, C(O)NHR, C(O)NH$_2$, C(O)OR, C(O)OH, C(O)R, C(O)H, CN, S(O$_2$)R, and NO$_2$, where R is any one of an alkyl, aryl, and carbazole group.

60. The device of claim 45, wherein said irradiating comprises:
   irradiating said material having said acceptor group comprising at least one of:

where * indicates the point of attachment of the accept to a π bridge via a single bond.

61. A device for measuring an optical pulse at a wavelength λ, comprising:
   a divider configured to receive the optical pulse from a source and divide the pulse into two parts to produce a time delay between each part;
   a combiner configured to combine the two parts of the optical pulse having said time delay;
   a material receiving said two parts of the optical pulse, said material comprising at least one molecule having a formula D-Π-A, where D is an electron donor group, A is an electron acceptor group, and Π is a conjugated structure having π bonds that connect D to A, said molecule exhibiting a strong absorption band centered at a wavelength λ$_0$ and exhibiting a weakly absorbing region as compared to the absorption band at λ$_0$ at a wavelength λ$_1$, such that λ$_1$<λ$_0$, that λ/2 has a value of about λ$_0$, and that λ/3 has a value of about λ$_1$;
   a detector configured to measure a third harmonic signal at λ/3 as a function of the time delay between the two parts of the optical pulse; and
   an extractor configured to extract, from said third harmonic signal as a function of the time delay, at least one of a pulse width and a pulse shape correlated with the optical pulse.

62. The device of claim 61, wherein the combiner is configured to combine said two parts of the optical pulse linearly in the material.

63. The device of claim 61, wherein the molecule is defied by the formula:

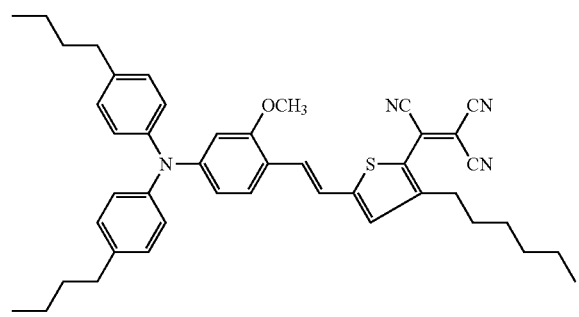

64. The device of claim 61, wherein the molecule is defined by the formula

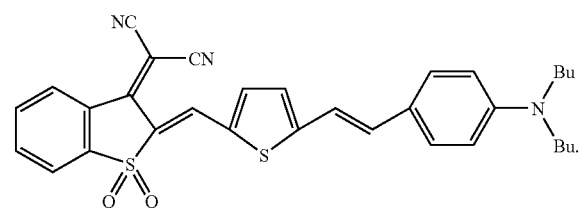

65. The device of claim 61, wherein the material comprises a polymer.

66. The device of claim 65, wherein said polymer comprises an amorphous glass.

67. The device of claim 65, wherein said molecule is attached as a side-chain to said polymer.

68. The device of claim 65, wherein said molecule is in a main chain of said polymer.

69. The device of claim 65, wherein said molecule is incorporated in a dendrimer.

70. The device of claim 61, wherein said material comprises:
an optically transparent polymer at the wavelength λ.

71. The device of claim 61, wherein said molecule includes a chromophore.

72. The device of claim 61, wherein said molecule in said weakly absorbing region has an absorption coefficient less than 10,000 cm$^{-1}$.

73. The device of claim 61, wherein said molecule is transparent at 1550 nm, absorbing at 775 nm, and weakly absorbing at 517 nm as compared to 775 nm.

74. The device of claim 61, wherein said material having said donor group comprises:
at least one of atoms or molecular groups having a low ionization potential.

75. The device of claim 61, wherein said material having said donor group comprises:
at least one of I, Br, Cl, F, OC(O)R, SH, OH, SR, OR, NHC(O)R, NH$_2$, NHR, NR$_2$, S$^-$, and O$^-$, where R is any one of an aryl group and a carbazole group.

76. The device of claim 61, wherein said material having said acceptor group comprises:
at least one of atoms or molecular groups having a high electron affinity.

77. The device of claim 61, wherein said material having said acceptor group comprises:
at least one of C(O)NR$_2$, C(O)NHR, C(O)NH$_2$, C(O)OR, C(O)OR, C(O)OH, C(O)OH, C(O)R, C(O)H, CN, S(O$_2$)R, and NO$_2$,
where R is any one of an aryl group and a carbazole group.

78. The device of claim 61, wherein said irradiating comprises:
irradiating said material having said acceptor group comprising at least one of:

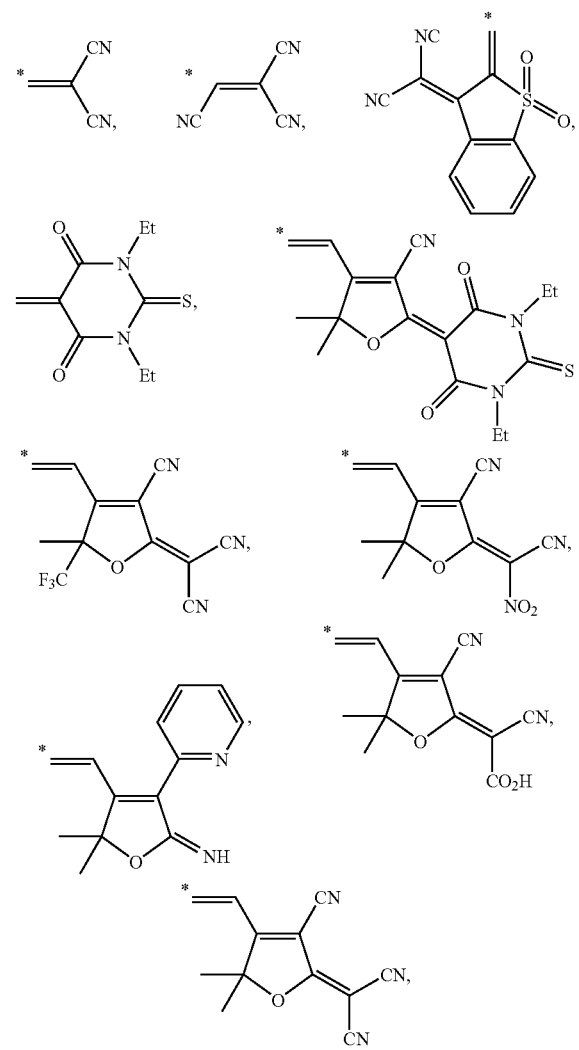

where * indicates the point of attachment of the accept to a π bridge via a single bond.

79. The device of claim 61, wherein said combiner is configured to combine the two parts of the optical pulse noncollinearly.

80. The device of claim 79, wherein said detector is configured to measure a spectrum of one of a plurality of third harmonic signals generated in directions that are different from directions of the two parts of the optical pulse as a function of the time delay between the two parts of the optical pulse.

81. The device of claim 80, wherein the extractor is configured to extract a phase of the optical pulse from the measured spectrum as a function of the time delay of said one of a plurality of third harmonic signals.

82. The device of claim 61, wherein said extractor is configured to determine, from a spectrally resolved third harmonic signal as a function of the time delay, a phase of said optical pulse.

83. The device of claim 61, wherein said optical pump is configured to generate a telecommunications laser pulse in a range from 1.4 to 1.6 microns.

84. The device of claim 83, wherein said extractor is configured to determine a pulse duration for said telecommunications laser pulse.

85. The device of claim 84, wherein said extractor is configured to determine at least one of a pulse width, a pulse shape, and a phase of said telecommunications laser pulse.

86. The device of claim 84, wherein said extractor is configured to determine at least one of a pulse width and a pulse shape of ultra-fast lasers having a pulse width of less than 100 picoseconds.

87. The device of claim 45, further comprising:
an optical divider and combiner configured to interact two time delayed optical pulses of the laser light in the material to thereby generate said third harmonic signal.

* * * * *